Jan. 20, 1959  M. DEN HERDER ET AL  2,870,086
FLUID PLATINUM CATALYST HYDROFORMING SYSTEM
Filed Nov. 26, 1954
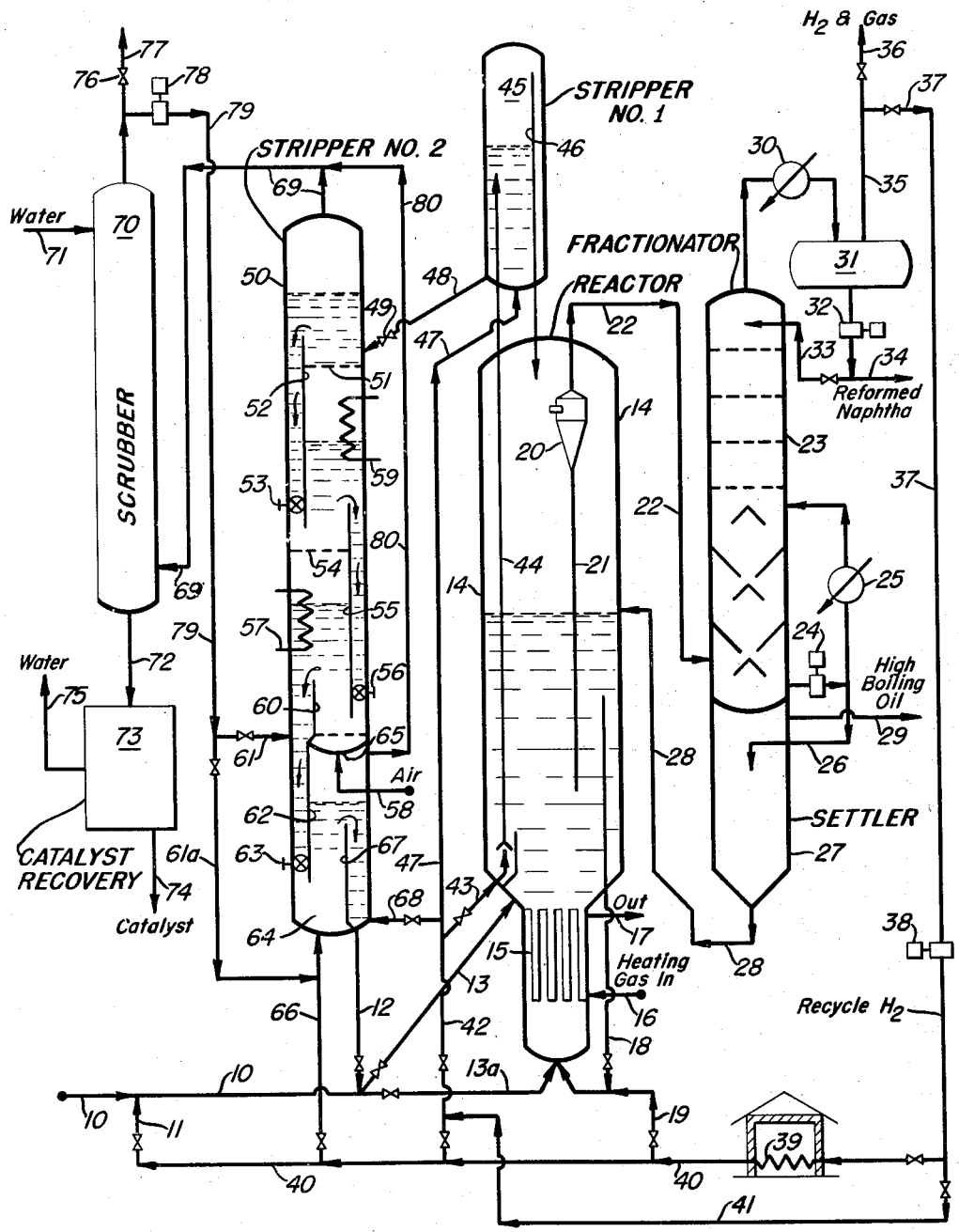
INVENTORS:
Marvin Den Herder
Russell V. Malo
BY
Donald E. Payne
ATTORNEY United States Patent Office 2,870,086
Patented Jan. 20, 1959

2,870,086

FLUID PLATINUM CATALYST HYDROFORMING SYSTEM

Marvin Den Herder, Chicago, Ill., and Russell V. Malo, Munster, Ind., assignors to Standard Oil Company, Chicago, Ill., a corporation of Indiana Application November 26, 1954, Serial No. 471,284

5 Claims. (Cl. 208—140)

This invention relates to an improved fluid platinum catalyst hydroforming system for increasing the octane number of naphthas or gasoline fractions.

Although fluid hydroforming has been developed commercially for molybdena-on-alumina catalysts (Destrehan Fluid Hydroformer, Proceedings American Petroleum Institute, Refining, vol. 32 M (III), 1952) we have found that such systems are not suitable for the use of platinum-containing catalysts. The problem of catalyst losses becomes acute when the value of the catalyst is $5.00 to $10.00 a pound. Platinum catalyst cannot be fully reactivated by regeneration techniques employed for molybdena-on-alumina catalysts and, for maximum effectiveness, requires rejuvenation as well as regeneration. Platinum catalysts are more sensitive to deactivation by sulfur, water and other impurities associated with charging stock and/or regeneration gases and hence present many problems when employed in a fluid catalyst system. An object of this invention is to provide a solution for such problems.

Since regeneration and rejuvenation facilities for a platinum hydroforming system are so small as compared to the reactor system, it has been proposed to introduce all gases from the regeneration, stripping and reduction portions of the system into the outlet end of the reactor so that catalyst contained therein would either be recovered by reactor cyclones or by scrubbing with heavy oil in the base of the fractionator. While this proposal would apparently solve the problem of catalyst recovery, it would introduce further problems. The water formed in the regeneration system would accumulate and build up in the recycle hydrogen stream to such an extent that the catalyst would be quickly deactivated. Sulfur would likewise build up in the system and cause catalyst deactivation. Thus, even though the amount of gas introduced from the regeneration system would not unduly decrease the percent of hydrogen in the recycle hydrogen gas stream, the water, sulfur and other impurities would be increased beyond tolerable limits. An object of our invention is to minimize carryover of water, sulfur and other impurities from the regeneration section to the recycle hydrogen stream in the reactor section.

A further object is to improve the effectiveness and increase the safety factor of a fluid platinum catalyst hydroforming system. Other objects will be apparent as the detailed description of the invention proceeds.

In practicing the invention, we may employ a reactor similar in design to that heretofore employed for molybdena-on-alumina catalyst except that additional heat input means are required in the reactor in view of the greater activity of the platinum catalyst and the more highly endothermic nature of the combined reactions which take place therein; such heat may be supplied by indirect heat exchange with hot combustion gas in the lower part of the reactor or by the use of a so-called mercury boiler or by circulating catalyst from the reactor through heat exchange tubes. In addition to the hydrogen stripping of spent catalyst above the reactor, we employ a flue gas stripping zone to eliminate all hydrogen from catalyst entering the regeneration zone. Cooling coils are employed in the regeneration zone for maintaining the fluidized catalyst therein at a temperature in the range of about 850 to 1050° F., the regeneration gas being that previously employed for effecting rejuvenation. The fluid catalyst in the rejuvenation zone is heated either by preheating the introduced air or by use of heat exchange coils within the zone so that rejuvenation is effected at a temperature of about 950 to 1100° F. Effective rejuvenation requires an oxygen partial pressure of at least .4 atmosphere and preferably at least 1 atmosphere; this is accomplished by employing air since the entire hydroforming system operates at a pressure in the range of about 100 to 500 p. s. i. g. Since substantially no air is consumed in the rejuvenation step, the rejuvenation gases supply the oxygen for catalyst regeneration wherein substantially all oxygen is consumed and the hot flue gas from the regeneration step is employed for stripping hydrogen from catalyst prior to its introduction to the regeneration zone. By employing scrubbed flue gas as a stripping agent, catalyst contamination may be minimized.

The rejuvenated catalyst should be stripped with a flue gas which is substantially free from $SO_2$ and water before it is contacted with hot hydrogen in order that no free oxygen may enter the reducing zone.

Since some water may be formed in the reducing zone, the off gas therefrom, as well as the off gas from the regenerator which has passed through the stripper, should not be introduced into a portion of the reactor section where water and sulfur might build up in recycled hydrogen. We prefer to scrub such gases with water in order to recover all catalyst therefrom as well as to eliminate from the gas most of the water and $SO_2$ contents thereof. The catalyst-free gases may then pass through an ordinary pressure reduction valve without erosion difficulty and the scrubbed flue gas may be employed as a stripping gas without danger of introducing undue amounts of contaminants into the system.

While the water scrubbing of off gases from the regenerator and flue gas stripper as well as from the catalyst conditioning or reducing zone is preferred, such gases may be introduced to the base of the fractionator if recycle hydrogen is separated from reactor effluent before said effluent is introduced into the fractionator. In this embodiment, any catalyst entrained in the regeneration, stripping or conditioning gases is scrubbed therefrom by the high boiling non-volatile scrubbing oil along with catalyst recovered from reactor effluent. If it is desired to avoid contamination of reactor effluent with combustion products, the regeneration flue gas, stripping, and catalyst conditioning gases may be scrubbed with such hot slurry oil in a separate vessel interposed between the fractionator and the reactor so that combustion products may be vented separately from the desired reaction products. While these alternative systems are effective for eliminating undue amounts of water in the hydrogen recycle system, there may be a tendency for some of the sulfur in combustion gases to be carried back with the oil stream to the reactor so that the separate water scrubber as hereinabove described is a preferred embodiment of our invention.

The invention will be more clearly understood from the following description of a specific example read in conjunction with the accompanying drawing which is a schematic flowsheet of our improved fluid platinum catalyst hydroformer system.

The naphtha charge to the system may be any naphtha of the type conventionally hydroformed by platinum catalysts. The naphtha should boil in the range of about 150 to 425° F., preferably about 200 to 400° F. While it is preferred to employ a naphtha containing at least about 40 percent of naphthenes, the process may be used for naphthas consisting chiefly of paraffins and having a relatively small naphthene content of the order of 15 percent. While some olefins may be tolerated in the charge, a saturated charge is preferred. Its sulfur content should not substantially exceed .02 percent, a preferred range being about .006 to 0.1 percent and its water content should not exceed about 40 parts per million, a water content of the order of 10 to 20 parts per million being preferred. Most naphthas contain about 2 to 10 parts per million of chloride which is desirable for its activating effect with platinum catalysts (J. A. C. S. 58, September 1936, page 1594 et seq.). If the naphtha contains excessive amounts of nitrogen, sulfur or other impurities, it may be pretreated by known methods to obtain a charge having the desired amounts of water and chloride and to have not more than about 5 parts per million of nitrogen.

The catalyst employed is platinum-on-alumina which may be prepared by various known methods such as described, for example, in U. S. 2,659,701. The catalyst may contain about .1 to 1 percent of platinum, preferably about .3 to .6 weight percent. It may contain combined halogen as described in Haensel 2,479,109–10 although such combined halogen is not essential, the amount desired for activating purposes usually being supplied by the chloro platinic acid employed in preparing the catalyst and/or by the chloride content of the ordinary raw naphtha charging stocks. The particle size of the catalyst should be chiefly in the range of about 2 to 100 microns with particle size distribution similar to that employed in fluid catalytic cracking processes. No novelty is claimed in the catalyst per se and it requires no further description.

Referring to the drawing, the naphtha is vaporized and preheated to about 950 to 1000° F. and introduced at a pressure of about 100 to 500, e. g. 300 p. s. i., through line 10 along with about 1000 to 8000 cubic feet per barrel of hot recycled hydrogen from line 11, the combined streams picking up conditioned catalyst from the base of standpipe 12 and preferably carrying the catalyst through transfer line 13 to that portion of the reactor 14 immediately above heating section 15 although the stream may be introduced by line 13a below the heating section. The catalyst to oil ratio in the transfer line is usually very small and of the order of .01 to .1 pound of catalyst per pound of oil charged. The reaction temperature is maintained in the reactor at about 850 to 980, e. g. about 900° F., by introducing hot combustion gas through line 16 to the shell side of heater 14 and withdrawing the flue gas through line 17. It should be understood that a mercury boiler or any other known type of heating means may be employed. The effectiveness of the heat exchanger is augmented by withdrawing catalyst from the reactor dense phase through standpipe 18 and returning it to the base of the reactor with superheated hydrogen from line 19. The space velocity in the reactor is preferably in the range of about 2 to 6, e. g. about 4, pounds of introduced naphtha per hour per pound of catalyst in the reactor. The vertical gas velocity in the reactor is preferably about .5 to 2, e. g. about 1, feet per second and, in any event, should be controlled to maintain the catalyst in the reactor in dense phase fluidized condition.

One or more stages of cyclone separators 20 may be employed for separating catalyst from reactor effluent, the separated catalyst being returned to the dense phase by dip leg 21 and the reactor effluent being conducted by line 22 to fractionator 23. The product is partially condensed in the base of the fractionator by recycling liquid by pump 24 through cooler 25 to a level above the scrubbing section, the net amount of heavy condensate being introduced by line 26 into settling section 27 from which a slurry of recovered catalyst in high boiling, non-volatile oil is returned by line 28 to the reactor and substantially catalyst-free, high boiling oil is withdrawn by line 29 through suitable filters for recovering residual amounts of catalyst.

The overhead stream from the fractionator passes through cooler 30 to receiver or separator 31 which preferably is operated at a temperature of about 100° F. Condensate is withdrawn by pump 32, a part of it being recycled by line 33 for reflux and the remainder of it being withdrawn by line 34 for stabilization and/or fractionation of ultimate liquid product.

A hydrogen stream is withdrawn from the top of separator 31 through line 35, a part of this stream being discharged through line 36 to a suitable absorber for recovering condensable hydrocarbons and the remainder being recycled through line 37 by a compressor 38 for use in the system. The major part of this recycled hydrogen stream is passed through heater 39 wherein it is heated to about 1000 to 1200, e. g. about 1100° F., and introduced by line 40 to lines 11, 19, etc. A part of the recycled hydrogen may by-pass heater 39 through line 41 and this cooler hydrogen stream may be employed either alone or in admixture with hot hydrogen for lifting, stripping, and conditioning catalyst as will hereinafter be described.

Hydrogen from line 42, which may be a mixture of hydrogen from lines 40 and 41, is introduced through line 43 as a lift gas to carry spent catalyst upwardly in conduit 44 to first stripper 45, the stripping gas being returned by conduit 46 to the upper part of reactor 14. Additional hydrogen stripping gas may be introduced by line 47 at the base of first stripper 45, permitting stripping temperatures as high as 1100° F.

Catalyst is withdrawn from stripper 45 through standpipe 48 in amounts controlled by valve 49 and introduced into a second stripping zone at the top of tower 50, this second stripping zone being that portion of tower 50 above perforated grid 51. Catalyst flows from the second stripper through downcomer 52 in amounts controlled by valve 53 into the regeneration zone of vessel 50, the top of which is grid 51 and the bottom of which is grid 54. Catalyst is withdrawn from the regeneration zone through downcomer 55 in amounts controlled by valve 56 into the rejuvenation zone which is at the base of tower 50. Heating coils 57 are employed for maintaining the temperature in the rejuvenation zone in the range of about 950 to 1100° F. although this temperature may be maintained by preheating the air which is introduced at the base of the rejuvenation zone through line 58. The amount of air will be that required to burn the carbonaceous deposits which, in a 9000 B./D. unit may be about 25 to 100, e. g. about 50, pounds per hour and the diameter of vessel 50 is such that the vertical velocity of the introduced air is sufficient to maintain the catalyst in each of the zones in dense phase fluidized condition. Since the rejuvenation zone operates at a higher temperature than the regeneration zone and since heat is liberated in the regeneration zone, cooling coils 59 are employed to maintain the fluidized solids in the regeneration at a temperature in the range of about 800 to 1000, e. g. about 900° F.

Catalyst leaves rejuvenation zone by well 60 wherein all oxygen is displaced from the descending catalyst by a stripping gas introduced by line 61 as will be hereinafter described. The stripped regenerated catalyst is then introduced by line 62 in amounts controlled by valve 63 into the reduction or catalyst conditioning zone 64 which is, in effect, a separate vessel partitioned from tower 50 by closure 65. Hot hydrogen is introduced at the base of the conditioning zone through line 66 and, here again, it should be understood that a mixture of hydrogen from lines 40 and 41 may be employed to obtain any desired temperature. The conditioned catalyst is withdrawn from well 67 and standpipe 12 for return to the reactor. If desired, the stripping gas instead of hydrogen may be introduced at the base of zone 64 and the hydrogen conditioning may be effected by introducing hot hydrogen through line 68.

It will be noted that the air introduced through line 58 is first employed for effecting rejuvenation of regenerated catalyst and that it then passes through grid 54 to effect catalyst regeneration, thus consuming the oxygen content of the introduced air and producing a flue gas containing water and some $SO_2$. This flue gas is next employed for stripping catalyst in the top of tower 50 and, in accordance with our invention, the regeneration gas after the stripping step is introduced by line 69 to scrubbing tower 70 wherein all of the catalyst particles are scrubbed out of the ascending gas stream by water or other suitable liquid introduced through line 71. The scrubbing liquid together with removed catalyst is introduced by line 72 to catalyst recovery zone 73 which may be a filtration or any other recovery means known to the art, the final catalyst being withdrawn through line 74 for reuse and the water being discharged through line 75.

The described sequence of stripping, regeneration, rejuvenation and reducing steps may be effected either continuously or intermittently. For continuous operation, the holding time in each of the zones may be about 10 to 20 minutes, e. g., about 15 minutes. By periodically interrupting the discharge of catalyst through line 44 and closing valves 49, 53, 56, 63 and the valve in standpipe 12, the catalyst may be retained in each of the zones for any desired length of time, i. e. for a time of about ½ hour to 10 or 20 hours. Ordinarily, however, the continuous operation with an average holding time of about 15 minutes in each zone is preferred.

The net production of scrubbed flue gas may be depressured in depressuring valve 76 and vented through line 77 since it contains no errosive solids. The scrubbing of the gas to remove catalyst will also cool the gas to about 100 to 150° F. and thus effect condensation and removal of most of the water produced in the regeneration step. The scrubbing step also removes $SO_2$ and other impurities from the gas. The scrubbed gas is, therefore, an ideal stripping agent and is returned by compressor 78 through line 79 for supplying such stripping gas to line 61 and line 61a. If desired, this stripping gas may be employed in the second stripping zone and gases from the regeneration zone may be introduced directly to scrubbing tower 70.

Since some water is also formed in the catalyst conditioning or reducing zone 64, the off gas from this zone is introduced by lines 80 and 69 to scrubbing tower 70. It will thus be seen that all water and other impurities produced in the regeneration and conditioning steps are prevented from reaching the reaction section, that all catalyst from these streams is recovered without the necessity of employing cyclone separators or gas filters and that the gases thus recovered may be vented through an ordinary pressure reducing valve without encountering errosion difficulties.

While we have described a specific example of the invention, it should be understood that modifications and alternative arrangements and operating conditions will be apparent from the above description to those skilled in the art. For example, instead of using water as a scrubber liquid in vessel 70, we may employ a hot non-volatile oil from line 28 in which case the scrubber effluent from line 72 could be returned directly to the reactor; this arrangement is less desirable because the water produced in the system would remain in the flue gas vented through line 77 and hence the stripping gas recycled through line 79 would not be so free from water or impurities. Alternatively, we may cool the reactor effluent in line 22 to about 100° F., separate the recycled hydrogen stream from the cooled effluent and then reheat the effluent for introduction into fractionator 23 in which case gases from line 69 may be introduced directly at the base of the fractionator. When reactor effluent is passed through a heat exchanger for cooling it to 100° F., or when the reactor effluent in line 22 is heat exchanged with recycle hydrogen prior to passing said hydrogen through heater 39, difficulty may be encountered because of solids accumulation in the exchanger; such difficulties may be alleviated at least to a certain extent by recycling condensate to the line just ahead of the heat exchanger so that the dew point will be reached before the stream reaches the heat exchanger and the solids will be carried therethrough by turbulent liquid flow.

From the foregoing, it will be seen that the objects of our invention have been accomplished and that a fluid platinum catalyst hydroforming system is provided which will avoid buildup of water and other impurities in the recycle hydrogen stream, avoid catalyst losses, and enable the attainment of remarkably extended run lengths without suffering undue catalyst deactivation.

We claim:

1. In a fluid platinum-on-alumina hydroforming system wherein a small amount of catalyst is withdrawn from the reactor, stripped with hydrogen, stripped with inert gas, regenerated by combustion of carbonaceous deposits, treated by contact with a gas having an oxygen partial pressure greater than .4 atmosphere at a temperature of about 900 to 1100° F. long enough to substantially restore its activity, reduced in a separate reducing zone and returned to the reactor, a hydrogen stream being separated from reactor effluent and recycled with naphtha charge to the system, the improved method of operation which comprises introducing into a scrubbing zone both regeneration gases and gases from the reducing zone and scrubbing both gases with water for removing catalyst particles, water, $SO_2$ and other impurities therefrom, recovering catalyst from the scrubbing water, venting a part of the scrubbed gases from the system whereby recycled hydrogen is not contaminated with water produced in the regeneration and reduction steps, and employing another part of the scrubbed gases for stripping catalyst introduced into the reducing zone whereby introduction of moisture into the hydroforming zone is minimized, catalyst losses are substantially avoided and regeneration gases may be passed through a pressure reduction valve without substantial erosion.

2. The method of hydroforming naphtha with a platinum-on-alumina catalyst, which method comprises vaporizing and heating a naphtha which contains about 2 to 10 parts per million of halide, about 5 to 20 parts per million of water and about 60 to 100 parts per million of sulfur to a temperature in the range of about 900 to 1000° F., admixing hot hydrogen with said hot naphtha vapors in amounts in the range of about 1000 to 5000 cubic feet per barrel, contacting said mixture with a fluidized bed of platinum-on-alumina catalyst at a pressure in the range of about 100 to 500 p. s. i. and a temperature in the range of about 850 to 980° F. with a weight space velocity in the range of about 2 to 6 pounds of naphtha charge per hour per pound of catalyst in the reaction zone, scrubbing reactor effluent with hot condensate to recover catalyst therefrom, separating hydrogen from reactor effluent to obtain a recycle hydrogen stream and passing said stream through a heating zone back to said reactor, removing a small amount of catalyst from the reaction zone to a first stripping zone and therein stripping said catalyst with hydrogen, removing said stripped catalyst to a second stripping zone and therein stripping it with hot flue gas, regenerating the catalyst after the second stripping step by burning carbonaceous deposits therefrom to supply said flue gas, rejuvenating the regenerated catalyst by contacting it with a gas having an oxygen partial pressure greater than .4 atmosphere at a temperature of about 950 to 1100° F., stripping oxygen from rejuvenated catalyst, reducing said last named catalyst in a reducing zone, returning reduced catalyst to the reaction zone, scrubbing with water the flue gas produced in the regeneration zone and the gases from the reduction zone in order to recover catalyst particles therefrom and venting scrubbed gases from the system at a point beyond the hydrogen recycle section of the system whereby water produced in the regeneration step does not contaminate recycled hydrogen and whereby gases may be depressured without errosion difficulties.

3. The method of claim 2 which includes the further step of returning a part of the scrubbed gases for stripping oxygen from catalyst from the regeneration zone prior to introducing it into said reduction zone.

4. The method of hydroforming naphtha with a supported platinum catalyst, which method comprises vaporizing and heating a naphtha which contains about 2 to 10 parts per million of halide, about 5 to 20 parts per million of water and about 60 to 100 parts per million of sulfur to a temperature in the range of about 900 to 1000° F., admixing hot recycled hydrogen with said hot naphtha vapors, contacting said mixture with a bed of supported platinum catalyst at a pressure in the range of about 100 to 500 p. s. i. at temperatures in the range of about 850 to 980° F. and for a time to obtain substantial hydroforming of the naphtha, separating hydrogen from reactor effluent to obtain said recycled hydrogen, segregating a part of the catalyst from on-stream conditions, stripping said segregated catalyst with hydrogen, removing hydrogen from the segregated catalyst by stripping it with flue gas, regenerating the segregated catalyst after the flue gas stripping step by burning carbonaceous deposits therefrom, rejuvenating the regenerated catalyst by contacting it with a gas having an oxygen partial pressure greater than .4 atmosphere at a temperature in the range of about 950 to 1100° F., stripping oxygen from rejuvenated catalyst, then reducing the rejuvenated catalyst with hydrogen, returning the reduced catalyst to on-stream conditions, scrubbing with water the flue gas produced in the regeneration zone in order to recover catalyst particles therefrom and venting scrubbed flue gases from the system to prevent their admixture with recycled hydrogen whereby water produced in the regeneration step does not contaminate recycled hydrogen.

5. The method of hydroforming naphtha with a supported platinum catalyst, which method comprises vaporizing and heating a naphtha which contains not more than 10 parts per million of halide, not more than 20 parts per million of water and not more than 100 parts per million of sulfur to a temperature in the range of about 900 to 1000° F., admixing hot recycled hydrogen with said hot naphtha vapors, contacting said mixture with a bed of supported platinum catalyst at a pressure in the range of 100 to 500 p. s. i. at a temperature in the range of 850 to 980° F. for a time to obtain substantial hydroforming of the naphtha, separating hydrogen from reactor effluent to obtain said recycled hydrogen, segregating a part of the catalyst from on-stream conditions, stripping said segregated catalyst with hydrogen, removing hydrogen from the segregated catalyst by stripping it with an inert gas, burning carbonaceous deposits from the stripped catalyst to form flue gas, treating the catalyst with a gas having a free oxygen partial pressure greater than .4 atmosphere at about 950 to 1100° F. long enough to substantially restore its activity, scrubbing the flue gas with water to remove catalyst particles, water, sulfur dioxide and other impurities therefrom, stripping oxygen from the treated catalyst with a part of the scrubbed flue gas, reducing the catalyst with hydrogen, returning the reduced catalyst to on-stream conditions, and venting from the system that portion of the scrubbed flue gas not used as a stripping gas so that it will not become mixed with recycled hydrogen.

References Cited in the file of this patent

UNITED STATES PATENTS

| | | |
|---|---|---|
| 2,303,680 | Brueckmann | Dec. 1, 1942 |
| 2,311,978 | Conn | Feb. 23, 1943 |
| 2,449,096 | Wheeler | Sept. 14, 1948 |
| 2,479,110 | Haensel | Aug. 16, 1949 |
| 2,665,239 | Howard et al. | Jan. 5, 1954 |
| 2,730,556 | Liedholm | Jan. 10, 1956 |
| 2,762,752 | Hemminger | Sept. 11, 1956 |
| 2,773,808 | Hemminger | Dec. 11, 1956 |